United States Patent [19]

Kiko et al.

[11] Patent Number: 4,771,449
[45] Date of Patent: Sep. 13, 1988

[54] DATA STATION TERMINATION CIRCUIT

[75] Inventors: Frederick J. Kiko, Bloomingdale; Lisa Danforth, Evanston, both of Ill.

[73] Assignee: Comfab, Inc., Addison, Ill.

[21] Appl. No.: 936,421

[22] Filed: Dec. 1, 1986

[51] Int. Cl.$^4$ ............................................. H04M 11/00
[52] U.S. Cl. ........................................ 379/97; 379/402; 379/442
[58] Field of Search ................. 379/93, 96, 97, 98, 379/345, 402, 403, 404, 405, 442, 443

[56] References Cited

U.S. PATENT DOCUMENTS

| | | | |
|---|---|---|---|
| 3,943,301 | 3/1976 | Ervin | 379/402 |
| 4,037,065 | 7/1977 | Nahay | 379/403 X |
| 4,419,756 | 12/1983 | Cheng-Quispe et al. | 379/98 |
| 4,598,172 | 7/1986 | Eriksson | 379/93 X |
| 4,607,139 | 8/1986 | Froment et al. | 379/93 X |

FOREIGN PATENT DOCUMENTS

2136236 9/1984 United Kingdom ................ 379/345

Primary Examiner—Keith E. George
Attorney, Agent, or Firm—McDermott, Will & Emery

[57] ABSTRACT

A data station termination circuit for connecting a four-wire, voice frequency transmission facility to either a four-wire or two-wire subscriber station in a telephone communication system for effecting a four-wire or two-wire mode of operation includes a gain/loss network coupled to a receive-in port for receiving incoming voice frequency data signals from a first signal transmission path of the four-wire transmission facility and for amplifying or attenuating the incoming voice frequency data signals. The gain/loss network is formed of a single operational amplifier, a set of binary weighted resistors, and a plurality of single-pole, single-throw slide switches. Other features disclosed include a battery back-up for use during a loopback condition and an optional equalization network for use in a second signal transmission path.

18 Claims, 6 Drawing Sheets

S3 SWITCHES
SHOWN
WITH 3.2dB LOSS

FIG.5a

S3 SWITCHES
SHOWN
WITH 3.2dB GAIN

DATA STATION TERMINATION CIRCUIT

BACKGROUND OF THE INVENTION

This invention relates generally to telephone communications systems and more particularly, it relates to a data station termination circuit for connecting a four-wire transmission facility to either a 4-wire or 2-wire subscriber station. The termination circuit has particular use in voice or audio band data channel applications for interfacing between a central office having a 4-wire circuit and a customer station having either a 4-wire or 2-wire terminating equipment such as a modem.

In telephony systems, a termination circuit is used to connect unidirectional receive and transmit paths of a 4-wire line at a central office with a 4-wire or 2-wire subscriber station. In the case of a 2-wire subscriber station, the termination circuit must separate bidirectional signals at a subscriber port so as to amplify or attenuate the signals in each direction separately. Further, the termination circuit must prevent the central office-transmitted signals received at the transmit-in port from being returned to the central office via the transmit-out port. Typically, prior art termination circuits provided a gain network formed of a first amplifier with a resistor network in the receive path and a loss network formed of a second amplifier with associated resistors in order to perform gain and attenuation functions. These prior art termination circuits thus suffer from the disadvantage of utilizing a relatively large number of circuit components and thus increased manufacturing costs.

It would be desirable to provide a data station termination circuit for connecting a 4-wire, voice frequency transmission facility to either a 4-wire or 2-wire subscriber station in a telephone communication system for effecting a four-wire or two-wire mode of operation which includes a gain/loss network formed of a single operational amplifier, a plurality of binary weighted resistors, and a plurality of separately operated single-pole, single-throw switches capable of performing both the gain and loss functions in the receive path. It would also be expedient to provide a data termination circuit which can be operated from either line power or shelf power. Further, a battery back-up is provided to permit its operation during loss of line power or shelf power and allows disconnecting of the line power current path during a loopback operation. An optional plug-in equalization circuit may be added in the transmit path if desired. A single ended cancellation operational amplifier is used to prevent the central office-transmitted signals received at the receive-in port from being returned thereto.

SUMMARY OF THE INVENTION

Accordingly, it is a general object of the present invention to provide a data station termination circuit for connecting a 4-wire transmission facility to either a 4-wire or 2-wire modem which is more simplified and thus more economical to manufacture and assemble as compared to the prior art termination circuits.

It is an object of the present invention to provide a data station termination circuit which includes a gain/loss network formed of a single operational amplifier, a plurality of binary weighted resistors, and a plurality of separately operated single-pole, single-throw switches in a receive path so that the incoming signal can be amplified or attenuated through the same plurality of resistors.

It is another object of the present invention to provide a data station termination circuit which includes a battery back-up so as to permit operation during loss of line power or shelf power.

It is still another object of the present invention to provide a data station termination circuit which includes an optional plug-in equalization network insertable in the transmit path.

It is yet still another object of the present invention to provide a data station termination circuit which includes a single ended cancellation operational amplifier connected between a receive path and a transmit path so as to economically prevent incoming signals from the transmission facility from being returned thereto.

In accordance with these aims and objectives, the present invention is concerned with the provision of a data station termination circuit for connecting a 4-wire, voice frequency transmission facility to either a 4-wire or 2-wire subscriber station in a communication system. The termination circuit includes a signal receive-in port which is adapted for connection to a first signal transmission path of the 4-wire transmission facility for receiving incoming voice frequency signals. There is provided a signal transmit-out port adapted for connection to a second signal transmission path of the 4-wire transmission facility for supplying outgoing voice frequency signals thereto. A signal receive-out port is adapted for connection to the subscriber station during only a 4-wire mode of operation for receiving the incoming voice frequency signals from the receive-in port. A signal transmit-in port is adapted for connection to the subscriber station during both the 4-wire and 2-wire modes of operation for sending the outgoing voice frequency signals to the transmit-out port.

The transmit-in port functions as a bidirectional port and is used also to receive the incoming voice frequency signals from the receive-in port during the 2-wire mode of operation. A 2W/4W circuit is connected between the first signal transmission path and the second signal transmission path for preventing the incoming voice frequency signals arriving at the receive-in port from the transmission facility from being returned to the transmit-out port. A gain/loss network is coupled to the receive/in port for receiving the incoming voice frequency signals from the first signal transmission path of the 4-wire transmission facility and for amplifying or attenuating the incoming voice frequency signals.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
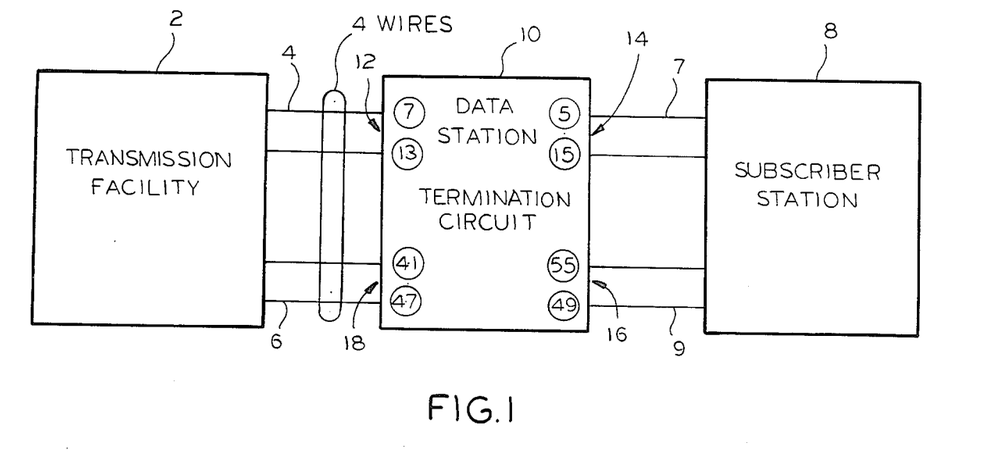
FIG. 1 is a block diagram of a data channel telephone communication system utilizing a data station termination circuit incorporating the principles of the present invention.

Referring now in detail to the drawings, there is shown in FIG. 1 a block diagram of a data channel telephone communication system which utilizes a data station termination circuit 10 incorporating the principles of the present invention. The termination circuit 10 is connected to a transmission facility 2 such as a telephone company central office by a 4-wire circuit formed of a pair of transmission lines 4 and 6. The termination circuit 10 includes a receive-in port 12, a receive-out port 14, a transmit-in port 16, and a transmit-out port 18. Incoming voice or audio frequency data signals applied to the receive-in port 12 are the ones that originate from the four-wire transmission facility (i.e., from central office). These incoming signals are routed through to either the receive-out port 14 during a four-wire mode of operation or the transmit-in port 16 during a two-wire mode of operation.

A subscriber station 8 is connected to the termination circuit 10 via two pairs of wires 7 and 9. Outgoing voice or audio frequency data signals applied to the transmit-in port are the ones that originate from the four-wires (lines 7 and 9) subscriber station or the two-wires (line 9) subscriber station (i.e., the modem at the subscriber station having either two or four wires). These outgoing signals are routed through to the transmit-out port 18 during both the four-wire mode of operation and the two-wire mode of operation. However, during the two-wire mode, the incoming signals arriving at the receive-in port 12 from the transmission facility are prevented from reaching the transmit-out port 18.

During the four-wire mode, there are two separate signal transmission paths or portions. A first transmission path is used to transmit the incoming signals in one direction from the central office 2 to the subscriber station 8 and a second transmission path is used to transmit outgoing signals in the opposite direction from the subscriber station 8 to the central office 2. During the two-wire mode, the transmit-in port 16 serves as a bidirectional terminal in which outgoing voice frequency signals are transmitted from the subscriber station 8 and incoming voice frequency signals are received by the subscriber station 8 at the same transmit-in port 16. The outgoing signals are transmitted to the transmission facility via the transmit-out port 18 and the incoming signals are received from the transmission facility via the receive-in port 12. Thus, the receive-out port 14 is not used during the two-wire mode of operation.

Figure 2:
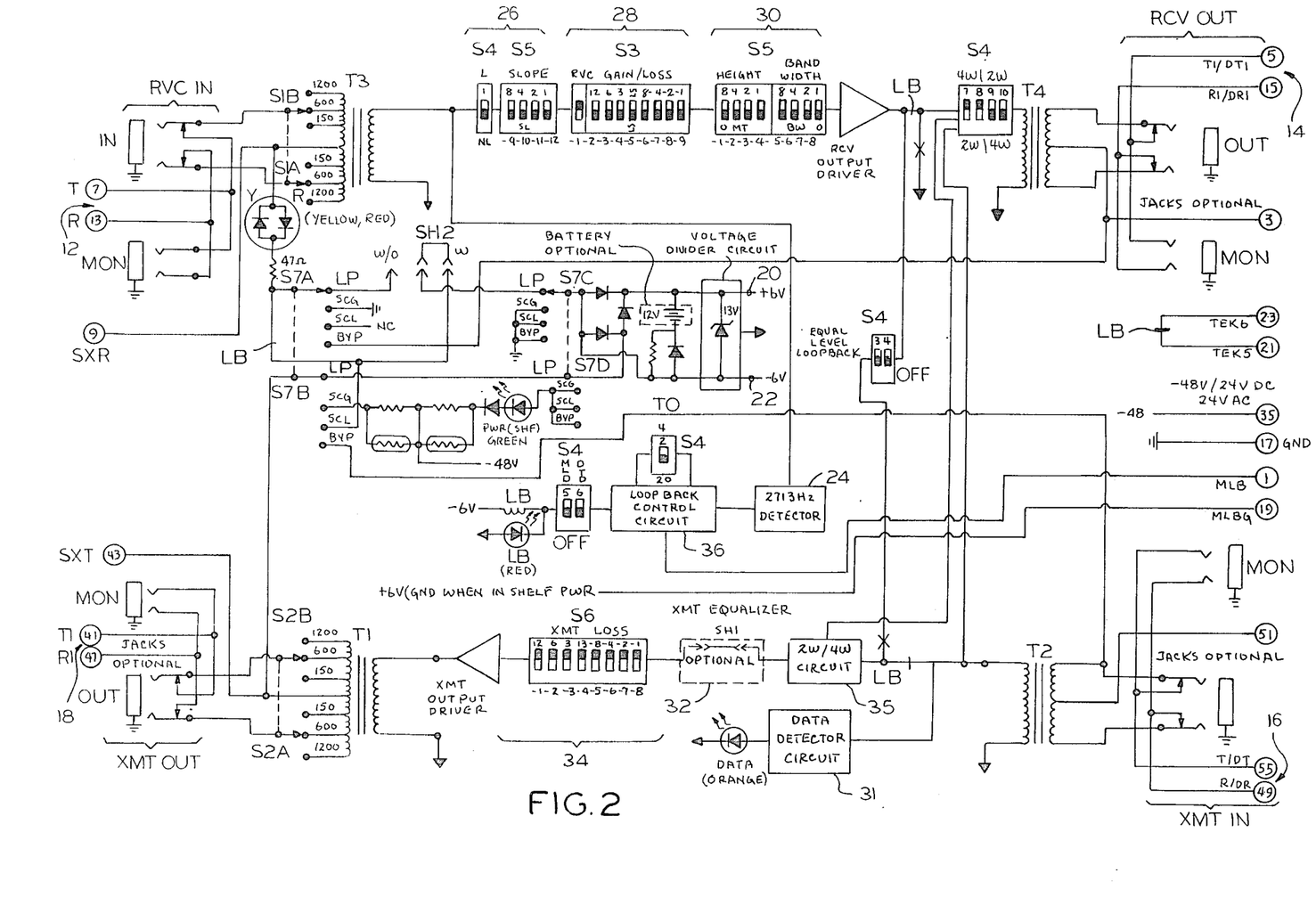
FIG. 2 is a simplified block diagram of the termination circuit of the present invention.
Figure 3A:
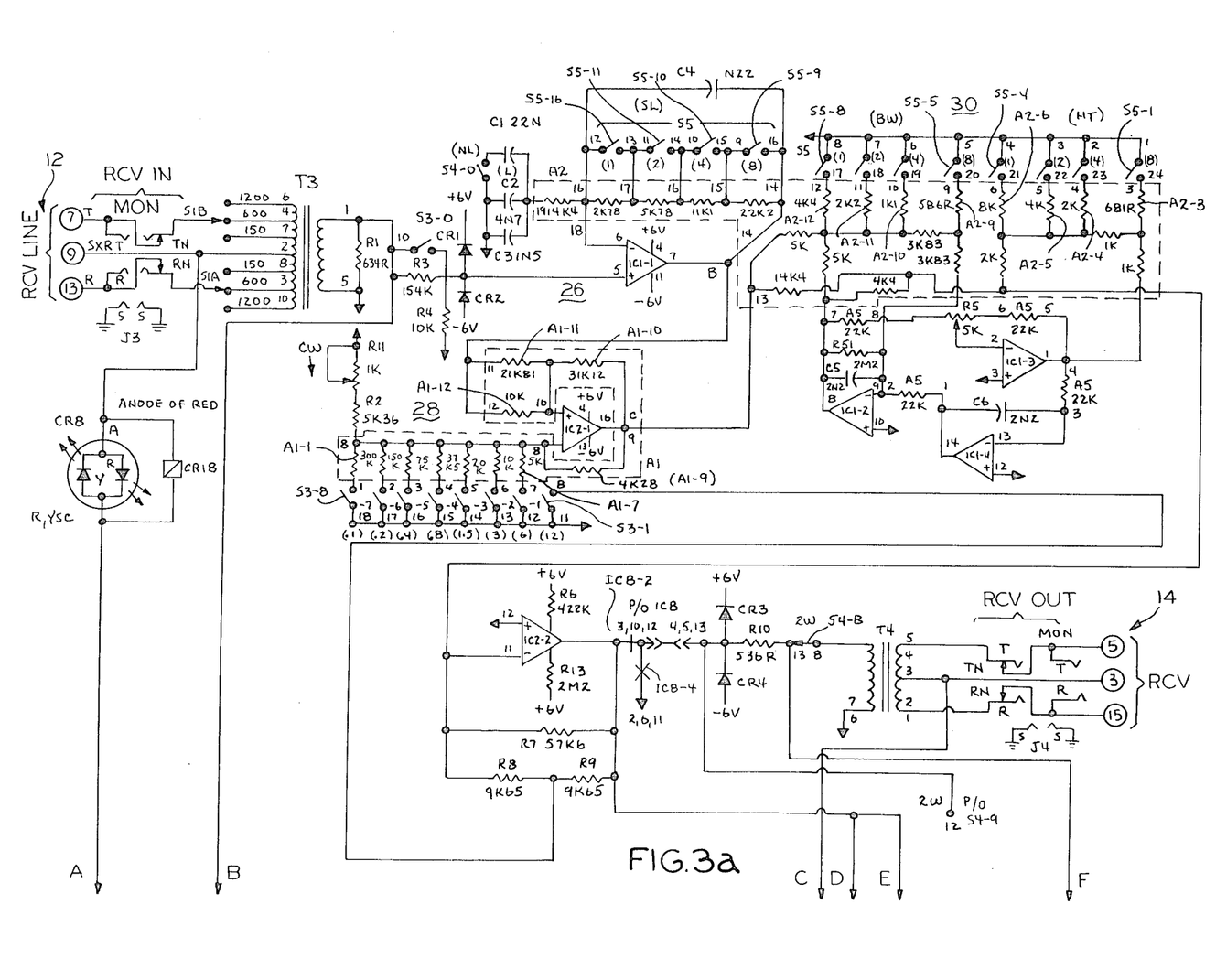
FIGS. 3(a) through 3(c), when connected together, form a detailed schematic circuit diagram of the termination circuit constructed in accordance with the present invention.
Figure 3B:
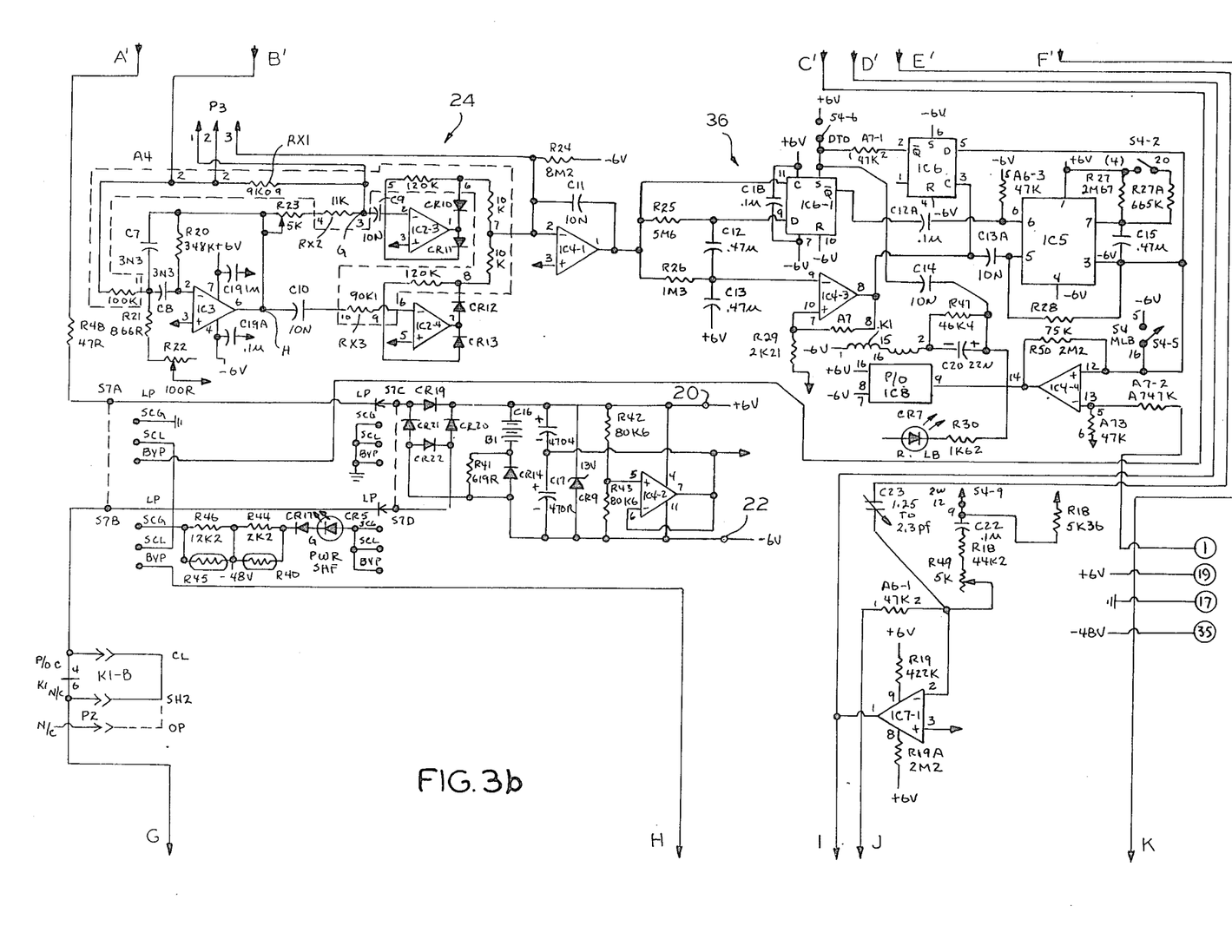
Figure 3C:
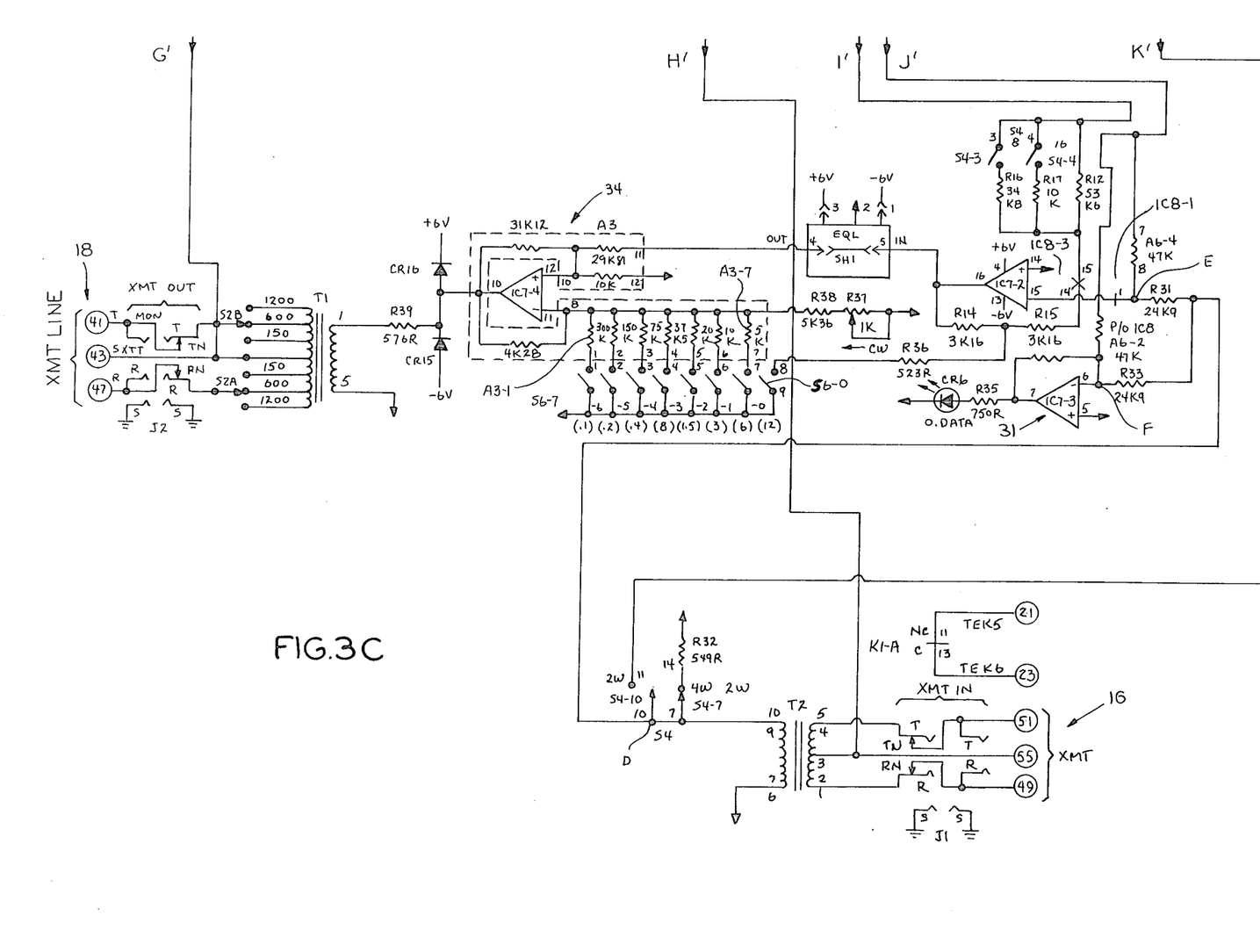

Referring now to FIGS. 2 and 3 of the drawings, it can be seen that the termination circuit 10 of the present invention may be operated by shelf power or line power. The shelf input voltage may be in the range of −24 to −53.5 Vdc or 24 VAC. Typically, the shelf input voltage is −48 Vdc. The nominal current is 20 ma for shelf power and 12 ma for line power. A multicontact switch S7 having wiper arms S7A, S7B, S7C and S7D is provided to select the power option when the wiper arms are positioned at any one of four different positions as shown by the four groups of four contacts. In the first position, as shown with the designation LP, the termination circuit is line powered by sealing current from an ETO channel unit, another termination circuit, or other source of supply over local facilities. In the other three positions (second through fourth), as shown with the respective designations SCG, SCL and BYP, the termination circuit is considered to be shelf powered.

When the switch S7 is in the SCG position, a sealing current is generated by the termination circuit 10. The shelf input voltage is received at pin 35 which is connected to one end of PTC thermistors R40 and R45 for limiting the amount of current. A diode CR17 has its cathode connected to the other end of the thermistor R40 for rectification purposes in the event that the input voltage is the 24 VAC. The anode of the diode CR17 is connected to a green-colored light-emitting diode (LED) CR5 which is lit indicating that shelf power is used. Diode CR5 has its anode connected to the input of a full-wave bridge rectifier formed of diodes CR19–CR22.

Capacitors C16 and C17, which filter out ripple in the voltage, are connected in series and have their ends joined to the output terminals of the bridge rectifier which is used to maintain correct current polarity in the event that a line powered unit is provided with a reversed sealing current. A zener diode CR9 is connected in parallel with the capacitors C16 and C17 to provide a regulated DC voltage. A voltage divider formed of resistors R42 and R43 are used to split the supply to +6 volts at terminal 20 and −6 volts at terminal 22 and a circuit "ground" or common. These supply voltages of ±6 volts are utilized by the other various components in the termination circuit 10. An optional battery B1 may be provided as a backup during loss of power when operating off of line power or shelf power. Thus, the termination circuit 10 will still be operational during a failure in the power supply. The battery B1 is normally charged through the resistor R41. Typically, the battery is ±12 volts which will provide the termination circuit with 10 ma for up to eight hours.

When the multicontact switch S7 is in the LP position, the termination circuit 10 is considered to be line powered wherein the power is received via the sealing current at the receive-in port 12 at pin 9. In normal line powered operations, a bidirectional yellow/red light-emitting diode CR8 will have its yellow portion lit. If the termination circuit is wired backwards or the power source on the pin 9 is reversed, the red portion of the diode CR8 will become lit. When the switch S7 is in the SCL or loopback position, the sealing current arriving at the receive-in port 12 is looped around back through the transmit path to the transmit-out port 18. When the switch S7 is in the BYP position the sealing current bypasses the termination circuit 10 entirely so that the sealing current path is connected directly from the receive-in port 12 to the receive-out port 14. In the same manner, the sealing current path is connected directly from the transmit-in port 16 to the transmit-out port 18.

The termination circuit 10 has its receive-in port 12 defined by a receive-in tip terminal on pin 7 and a receive-in ring terminal on pin 13 which are connected to the central office by telephone cable. The central office provides the transmission line 4 which is connectible to the pins 7 and 13 for transmitting the incoming voice frequency signals. The termination circuit 10 includes a multicontact switch S1 with wiper arms S1A and S1B which are positionable for impedance matching at any one of three different positions as indicated by the two groups of three contacts. The switch S1 is connected to a 1200 ohm termination in the first position, to a 600 ohm termination in the second position, and to a 150 ohm line termination in the third position. As illustrated, the switch S1 is in the second position.

In the receive path, a transformer T3 has its primary windings connected to the different contacts of the switch S1 to provide the selectable impedance termination of 1200, 600 or 150 ohms. A resistor R1 is connected across the secondary winding of the transformer T3. A resistor R3 has its one end connected to the resistor R1 and its other end connected to a resistor R4. The other end of the resistor R4 is connected to a ground potential. A switch contact S3-0 is shunted across the resistor R3. The combination of the resistors R3, R4, and the switch contact S3-0 functions as a voltage divider to provide a signal which has either 0 db or a 24 db loss at the node A. In particular, when the switch contact S3-0 is closed, then there will be no loss or gain (0 db). When the switch contact S3-0 is opened, there will be 24 db loss. Diodes CR1 and CR2 are provided for protection against transients. The signal from the resistor R1 is also routed to a loopback tone detector circuit 24 which will be described more fully hereinafter.

The signal at the node A is delivered to a slope equalization network 26 for adjusting its slope for a loaded or non-loaded cable. As is known, the non-loaded cable has more loss at high signal frequencies than at low signal frequencies. The slope equalization network 26 includes an operational amplifier IC1-1, capacitors C1–C4, a resistor array A2, and manually operable slide switches S5-9, -10, -11 and -12. An overall slope adjustment to the frequency response of the network 26 is achieved by a switch contact S4-0. When the switch contact S4-0 is opened at the NL position, the capacitance value is the sum of the capacitors C2 and C3 for the non-loaded cable. When the switch contact S4-0 is closed at the L position, the capacitance value is the sum of the capacitors C1, C2 and C3 for the loaded cable. The slope of the frequency response is adjusted by the binary weighted resistors A2-14, A2-15, A2-16 and A2-17 in the resistor array A2 which are individually connected into the operational amplifier by the switches S5-9, -10, -11 and -12. When all of these switches are closed, there is no gain or loss (0 db). When all of the switches are opened, there is a 4 db gain at 1 KHz (more gain above 1 KHz and less gain below 1 KHz). Thus, there is provided an incremental gain-adjustment from 0 db to 4 db (at 1 KHz) in fifteen steps.

The output of the slope equalization network 26 is at the output of the operational amplifier IC1-1 or node B and is connected to the input of a gain/attenuation network 28. The gain/attenuation network 28 is comprised of a single operational amplifier IC2-1 and a gain/loss-adjusting network for selectively adjusting the gain/loss of the operational amplifier. The gain/loss-adjusting network includes a set of binary weighted resistors A1-1 through A1-7 in a resistor array A1 and a corresponding number of single-pole, single-throw slide switches S3-8 through S3-2 for individually connecting the respective resistors A1-1 through A1-7 into the network 28. This gain/loss-adjusting network provides a linearly weighted, incremental gain/loss-adjustment in db. The operational amplifier IC2-1 is provided with input resistors A1-11 and A1-12 connected in parallel, a feedback resistor A1-10 connected between its output and its non-inverting input, and a further feedback resistor A1-9 connected between its output and its inverting input. The output of the slope equalization network 26 is fed though the input resistors A1-11 and A1-12 to the operational amplifier IC2-1. The inverting input of the amplifier IC2-1 is connected through an input resistor R2 and a potentiometer R11 to a ground potential.

As is shown, the switches S3-8 through S3-2 are connected in series with the resistors A1-1 through A1-7, respectively. The connections are such that closure of the switches S3-8 through S3-2 will individually connect their associated binary weighted resistors in parallel with the series connection of the resistor R2 and the potentiometer R11. When the switch S3-0 is closed (0 db loss in resistor divider) all of the switches S3-8 through S3-1 are opened (0 db gain) to provide a net 0 db gain. Then, the amount of gain is selectively adjusted in 0.1 db increments by closing the switches S3-8 through S3-1 individually and in various combinations dependent upon the binary weighted relationship. When the switch S3-0 is opened (24 db loss in resistor divider) all of the switches S3-8 through S3-1 are closed (24 db gain) to provide a net 0 db loss. Then, the amount of loss is selectively adjusted in 0.1 db increments by opening the switches S3-8 through S3-1.

Figure 5A:
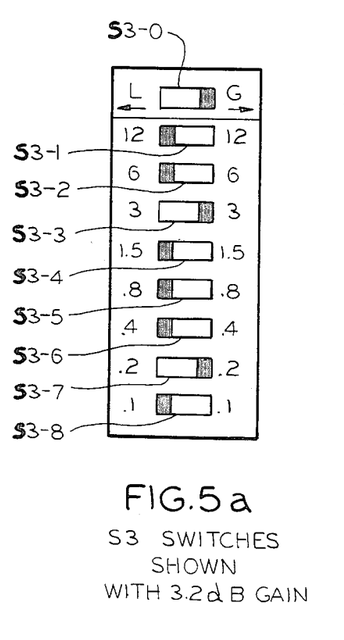
FIGS. 5(a) and 5(b) are diagrams showing the positions of the switches S3-0 through S3-8 for a 3.2 db gain and a 3.2 db loss, respectively.
Figure 5B:
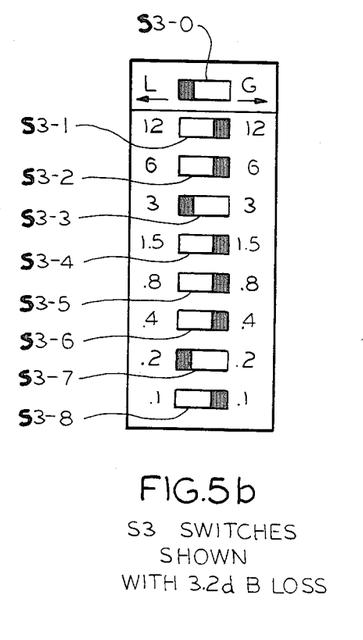

As can be seen from FIG. 5(a), the top switch (S3-0) is slid to the right side (gain direction) and the amount of gain is the sum of the numbers on the right side in which the switches S3-1 through S3-8 have been positioned also to the right side. FIG. 5(a) shows the position of the switches set for a 3.2 db gain. Similarly, as can be seen from FIG. 5(b), the top switch S3-0 is slid to the left side (loss direction) and the amount of loss is the sum of the numbers on the left side in which the switches (S3-1 through S3-8) have also been positioned to the left side. FIG. 5(b) shows the positions of the switches set for a 3.2 db loss. Thus, such a gain/attenuation network 28 has the advantage of requiring a smaller amount of components than traditionally required to provide both the desired gain and loss adjustment and is of simplified, low cost construction in which the gain/loss adjustment is conveniently set up or calibrated directly in db which can be read directly by the switch positions that have been labelled with corresponding db designations.

The output of the gain/attenuation network 28 is at the output of the operational amplifier IC2-1 or node C and is fed to an amplitude and bandwidth equalization circuit 30 for controlling the height and bandwidth response in the band pass for the telephone communication system. The equalization circuit 30 includes an amplitude adjustment portion and a bandwidth adjustment portion. The equalization circuit includes an operational amplifier IC1-2, an operational amplifier IC1-3, and an operational amplifier IC1-4. The amplitude adjustment portion includes weighted resistors A2-3 through A2-6 and slide switches S5-1 through S5-4 connected in series with the respective resistors A2-3 through A2-6. The bandwidth adjustment portion includes weighted resistors A2-9 through A2-12 and slide switches S5-5 through S5-8 for controlling the respective resistors A2-9 through A2-12.

When the switches S5-1 through S5-4 are all closed, there is no gain or loss (0 db) from the output of the amplifier IC1-4. When the switches S5-1 through S5-4 are opened, there is approximately a 11 db gain at the bump frequency of 3250 Hz. Thus, at 3250 Hz the amplitude response can be adjusted from 0 db to 11 db in fifteen steps. When the switches S5-5 through S5-8 are closed, the bandwidth is approximately 200 Hz. When the switches S5-5 through S5-8 are opened, the bandwidth is approximately 3400 Hz. Therefore, the bandwidth can be varied from 200 Hz to 3400 Hz in fifteen steps.

The output of the amplitude and bandwidth equalization network 30 is connected to a receive-output driver stage formed of an operational amplifier IC2-2. It will be noted that the operational amplifier IC2-2 is used to separately switch in a 12 db loss or gain via the switch S3-1. This is because of the non-linearity in the gain/loss switch selection which would exist if the amplifier IC2-1 were used alone to provide all of the gain steps. For a four-wire mode of operation, the signal from the output of the operational amplifier IC2-2 is sent to the primary winding of the transformer T4 via a source resistor R10 and a switch S4-8. The secondary windings of the transformer T4 are connected to the receive-out port 14 which includes a receive-out tip terminal at pin 5 and a receive-out ring terminal at pin 15. The two-wire mode of operation will be discussed later.

In the transmit path, the data termination circuit 10 has its transmit-in port 16 connected to the subscriber side via a transmit-in tip terminal on pin 55 and a transmit-in ring terminal on pin 49. The lines 9 are connected at its one end to the subscriber station 8 and its other end connected to the pins 55 and 49 for transmitting the outgoing data signals to the transmission facility 2. A transformer T2 has its primary winding connected between the pins 55 and 49. The secondary winding is connected through switch S4-7 to a load resistor R32 for impedance matching. A data detector 31 formed of an operational amplifier IC7-3 is used to detect the presence of incoming data signals in the transmit-in port 16. These data signals are received on the inverting input of the amplifier IC7-3 via the transformer T2 and the resistor R33. An orange-colored light-emitting diode CR6 is connected to the output of the amplifier IC7-3 and will begin to light at approximately −25 db and become brighter as the outgoing data signal increases in level.

Figure 4:
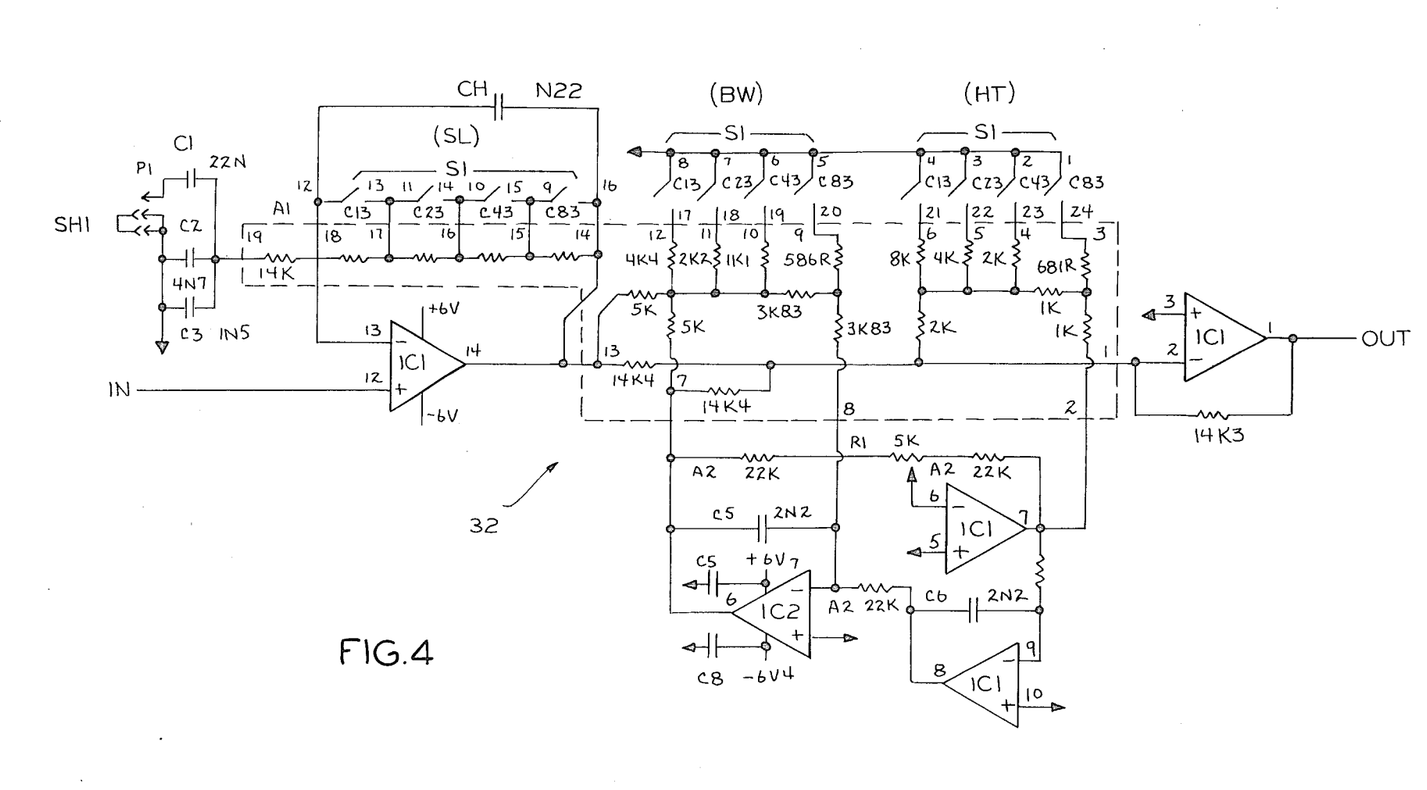
FIG. 4 is a schematic circuit diagram of an optional plug-in equalization network which may be used for the block 32 in FIG. 3(d)

These outgoing data signals from the secondary winding of the transformer T2 are also fed via a resistor R31 to a transmit-driver stage formed of an operational amplifier IC7-2. This amplifier IC7-2 functions similarly to the amplifier IC2-2 and is used to switch in separately a 12 db loss via a switch S6-0. The output of the amplifier IC7-2 may be fed to an optional plug-in equalization network 32. The network 32 is formed substantially identical to the slope equalization network 26 and the amplifier and bandwidth equalization network 30 discussed above in the receive path. A detailed schematic circuit diagram of the network 32 is shown in FIG. 4 of the drawings. The output of the equalization network 32 is connected to the input of an attenuation network 34.

The attenuation network 34 is similar to the gain/loss network 28 in the receive path in its construction, but provides only a loss. The network 34 is comprised of an operational amplifier IC7-4, binary weighted resistors A3-1 through A3-7, and slide switches S6-7 through S6-1 for controlling the respective resistors A3-1 through A3-7. The two input resistors are not connected in parallel as in the gain/loss circuit in the receive path. Rather, they form a resistor divider that gives 12 db of loss to the incoming signals. When all of the switches S6-1 through S6-7 and S6-0 are closed, S6-1 through S6-7 give 12 db gain and S6-0 gives 12 db loss resulting in a net 0 db loss. Then, the switches S6-1 through S6-7 are selectively opened individually and in various combinations dependent upon the binary weighted relationship to provide the desired loss. As will be recalled, a 12 db loss is switched in separately by the switch S6-0 to the amplifier IC7-2 because of non-linearities. Resistor R38 connected in series with a potentiometer R37 is used to add a certain db gain to compensate for the loss through the transformer T2. The potentionmeter R37 is used to trim the total resistance value so as to offset any variations in the resistance of the transformer T2. The use of input resistors in loss and gain/loss circuitry allow for the use of the same resistor array in both, and also provides a flexible building block for future gain/loss circuits.

The output of the amplifier IC7-4 functions also as a transmit-output driver and is connected to the primary winding of the transformer T2 via a source resistor R39 which is used for impedance matching of the primary winding. The diodes CR15 and CR16 are used again to protect against transients. The data station termination circuit 10 has its transmit-out port 18 connected to the central office via transmit-out tip terminal on pin 41 and a transmit-out ring terminal on pin 47. The central office provides the transmission line 6 which connects to the pins 41 and 47 for receiving the outgoing data signals from the subscriber station. A multicontact switch S2 with wiper arms S2A and S2B are positionable for impedance matching at any one of three different positions as indicated by the two groups of contacts. The switch S2 is connected to a 1200 ohm termination in the first position, a 600 ohm termination in the second position, and a 150 ohm termination in the third position. As shown, the switch S2 is in the second position. The secondary windings of the transformer T1 are connected to the different contacts of the switch S2 to provide the selectable impedance terminations of 1200, 600, or 150 ohms.

During a two-wire mode of operation, incoming data signals arriving at the receiving-in port 12 from the central office are setn in the receive path to the output of the amplifier IC2-2. These signals are received at node D via the resistor R10 and a 2W/4W circuit 35. The 2W/4W circuit 35 is formed of switches S4-7 through S4-10 and a cancellation operational amplifier IC7-1 and its associated components. It will be noted that the switches S4-7 through S4-10 will be moved to the 2W position during this two-wire mode of operation. These signals at the node D are transmitted in two directions. A first direction is through the transformer T2 to the transmit-out port 16. A second direction is through the resistor R31 to the inverting input of the amplifier IC7-2 at node E. In order to prevent the incoming data signals from being transmitted back to the transmission facility via the amplifier IC7-2 and the transmit-out port 18, the cancellation operational amplifier IC7-1 is utilized. With the switch S4-9 in the 2W position, the inverting input of the amplifier IC7-1 receives also the incoming data signals from the output of the amplifier IC2-2 via a capacitor C22, a resistor R18 and a potentiometer R49. The output of the amplifier IC7-1 provides a signal through a resistor A6-4 to the node E which has an amplitude equal to the signal sent via the resistor R31, but is inverted so that the net signal arriving at the inverting input of the amplifier IC7-2 is zero. Thus, the incoming data signals are only sent through the transformer T2.

It will be noted that the amplifier IC7-3 in the data detector 31 uses the same signal cancellation technique via a resistor R33 and a resistor A6-2 connected to the inverting input of the amplifier IC7-3 at node F. Thus, the diode CR6 will not be lit due to the incoming data signals. In the 2-wire mode, the transmit-in port 16 is a bidirectional terminal and is also used to transmit data signals from the subscriber station 8 to the transmission facility 2 via the amplifier IC7-2 and the transmit-out port 18 as was done in the 4-wire mode.

The tone detector 24 includes a multiple feedback bandpass filter formed of an operational amplifier IC3, resistors R20 and R21, potentiometer R22 and capacitors C7 and C8. The bandpass filter is set with a center frequency of $f_0 = 2713$ Hz. The potentiometer R22 is used to allow tuning of the center frequency. A bandstop filter is implemented by subtracting the output of the bandpass filter from the original signal. As can be seen, the original signal is fed to a node G via a resistor RX1 and the output of the bandpass filter is fed to the node G via a potentiometer R23 and a resistor RX2. The output of the bandstop filter at the node G is fed through a capacitor C9 to an operational amplifier IC2-3 for rectification. The output of the bandpass filter at node H is fed through a capacitor C10 and a resistor RX3 to an operational amplifier IC2-4 for rectification. An operational amplifier IC4-1 is used to compare the rectified outputs of the bandpass filter and bandstop filters. When the bandstop output signal is less than the bandpass output signal, the output of the amplifier IC4-1, which is normally high, goes low indicating detection of a frequency of 2713 Hz ±7 Hz.

Loopback is controlled by a timing and control network 36 which is responsive to a valid tone signal detected at the output of the amplifier IC4-1. An operational amplifier IC4-3 is responsive to the valid tone signal for generating deactivation pulses which are applied to the "reset" input (pin 5) of a long range timer IC5. Any long range timer may be used which is similar to one commercially available from Exar Corporation designated with part No. XR2243. A flip-flop IC6-1 is also responsive to the tone signal for generating activation pulses which are applied to the "set" input (pin 6) of the timer IC5. When the activation pulses are received on pin 6, the output of the timer (pin 3) will go low to indicate a loopback condition. This low output signal is fed to an amplifier IC4-4 whose output drives a relay K1 and an analog transmission gate or multiplexer IC8. If a deactivation pulse is not received after a certain time interval such as twenty minutes, the timer IC5 will reset itself through resistor R28. This time interval is determined by a time constant formed by a resistor R27 and a capacitor C15.

The relay K1 will become energized during loopback so as to cause the normally-closed contacts K1-A connected by leads TEK-5 and TEK-6 to respective pins 21 and 23 to open. Also, the normally-closed contact K1-B will be opened so as to break the SCL or SCG path if in shelf power, or the LP path if in line power with a battery backup. Further, the multiplexer IC8 will be switched so that the normally-closed contacts IC8-1 and IC8-2 will become opened and the normally-opened contacts IC8-3 and IC8-4 will become close. As a result, the transformers T2 and T4 at the subscriber station interface are automatically terminated by 600 ohms for both the two-wire or four-wire mode of operation. Further, the incoming signals from the amplifier IC2-2 are looped around into the amplifier IC7-2 and to the transmit-out port 18 defining a loopback condition. A visual indicator is formed by a red light-emitting diode CR7 which becomes lit during this loopback condition.

The tone detector 24 may be disabled by a switch S4-6 connected to the set input of a flip-flop IC6-1 so as to prevent activation pulses at its output. Further, manual loopback may be accomplished by a switch contact S4-5 or by connectig pin 1, which is connected to the inverting input of the amplifier IC4-4, to a ground potential. Equal level loopback gain of 0, 8 or 16 db may be selected by switches S4-3 and S4-4. The time interval before the loopback condition is reset automatically can be controlled to be four minutes or twenty minutes by switch S4-2.

From the foregoing detailed description, it can thus been seen that the present invention provides a data station termination circuit for connecting a four-wire transmission facility to either a four-wire or two-wire subscriber station which includes a gain/loss network disposed in a receive path. The gain/loss network permits the gain or loss to be selectively adjusted in equal db increments and is comprised of an operational amplifier, a set of binary weighted resistors, and a plurality of slide switches. The termination circuit also includes a battery back-up feature and an optional plug-in equalization network which is insertable in the transmit path.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore it, is intended that this invention not be limited to the particular embodiment disclosed as the best mode contemplated for carrying out the invention, but that the invention will include all embodiments falling within the scope of the appended claims.

What is claimed is:

1. A data station termination circuit for connecting a four-wire, voice frequency transmission facility to either a four-wire or two-wire subscriber station in a telephone communication system for effecting a four-wire or two-wire mode of operation, said termination circuit comprising:

a signal receive-in port adapted for connection to a first signal transmission path of said four-wire transmission facility for receiving incoming voice frequency data signals;

a signal transmit-out port adapted for connection to a second signal transmission path of said four-wire transmission facility for supplying outgoing voice frequency data signals thereto;

a signal receive-out port adapted for connection to said subscriber station during only the four-wire mode of operation for receiving said incoming voice frequency data signals from said receive-in port;

a signal transmit-in port adapted for connection to said subscriber station during both the four-wire and two-wire modes of operation for sending said outgoing voice frequency data signals to said transmit-out port;

said transmit-in port functioning as a bidirectional port and being used also to receive said incoming voice frequency data signals from said receive-in port during the two-wire mode of operation;

2W/4W circuit means connected between said first signal transmission path and said second signal transmission path for preventing said incoming voice frequency data signals arriving a said receive-in port from said transmission facility from being returned to said transmit-out port during the two-wire mode of operation;

gain/loss circuit means coupled to said receive-in port for receiving said incoming voice frequency data signals from the first signal transmission path of said four-wire transmission facility and for amplifying or attenuating said incoming voice frequency data signals and sending them to the receive-out port during the four-wire mode of operation and sending them to the transmit-in port during the two-wire mode of operation; and said gain/loss circuit means including an operational amplifier, a plurality of binary weighted resistors operatively connected to said operational amplifier, and a plurality of separately operated single-pole, single-throw switches, each switch being coupled in series with a respective one of said plurality of resistors.

2. A data station termination circuit as claimed in claim 1, further comprising voltage divider means coupled between said receive-in port and said gain/loss circuit means for providing either 0 db or a 24 db loss, said plurality of switches being initially all opened when said voltage divider means provides 0 db loss and then being selectively closed individually and in various combinations for amplifying said incoming voice frequency data signals in equal db increments, said plurality of switches being initially all closed when said voltage divider means provides 24 db loss and then being selectively opened individually and in various combinations for attenuating said incoming voice frequency data signals in equal db increments.

3. A data station termination circuit as claimed in claim 2, wherein the amount of gain or loss in said gain/loss circuit means is read directly in db by positions of said plurality of switches which have been labelled with corresponding db designations.

4. A data station termination circuit as claimed in claim 1, further comprising power supply circuit means for operating said termination circuit from an internal shelf power or a line power supplied externally, said power supply circuit means including a multiposition switch for switching between the shelf power and the line power.

5. A data station termination circuit as claimed in claim 4, further comprising a battery back-up for operating said termination circuit during a loss of power condition, said battery backup further permitting disconnecting of the line power or shelf power during a loopback condition.

6. A data station termination circuit as claimed in claim 4, further comprising visual indicating means coupled to said line power and said shelf power for indicating whether said termination circuit is being powered from the line power or shelf power.

7. A data station termination circuit as claimed in claim 6, wherein said visual indicating means comprises a pair of light-emitting diodes, one of said pair being responsive to the line power and the other one being responsive to shelf power.

8. A data station termination circuit as claimed in claim 1, further comprising loss circuit means coupled to said transmit-in port for coupling said outgoing voice frequency data signals to said transmit-out port and for attenuating said outgoing voice frequency data signals.

9. A data station termination circuit as claimed in claim 8, further comprising a plug-in type equalization network adapted for connection to said transmit-in port for adjusting the slopes, height and bandwidth frequency response of said outgoing voice frequency data signals.

10. A data station termination circuit as claimed in claim 1, wherein said 2W/4W circuit includes a cancellation operational amplifier responsive to said incoming voice frequency data signals for cancelling a signal that is fed in the direction of said transmit-out port.

11. A data station termination circuit as claimed in claim 1, further comprising a data detector circuit coupled to said transmit-in port for detecting outgoing voice frequency data signals.

12. A data station termination circuit as claimed in claim 11, wherein said data detector circuit includes visual indicating means formed of a light emitting-diode which becomes lit when outgoing voice frequency data signals are transmitted from the subscriber station.

13. A data station termination circuit as claimed in claim 1, further comprising a tone detector circuit coupled to said receive-in port for detecting a valid tone signal.

14. A data station termination circuit as claimed in claim 13, further comprising timing and control means responsive to the valid tone signal for effecting a loopback condition.

15. A data station termination circuit as claimed in claim 14, further comprising visual indicating means formed of a light-emitting diode for indicating the loopback condition.

16. A data station termination circuit as claimed in claim 14, further comprising manual loopback means for effecting manually the loopback condition.

17. A data station termination circuit as claimed in claim 14, further comprising means for disabling of the loopback condition.

18. A data station termination circuit for connecting a four-wire, voice frequency transmission facility to either a four-wire or two-wire subscriber station in a telephone communication system for effecting a four-wire or two-wire mode of operation, said termination circuit comprising:

a signal receive-in port adapted for connection to a first signal transmission path of said four-wire transmission facility for receiving incoming voice frequency data signals;

a signal transmit-out port adapted for connection to a second signal transmission path of said four-wire transmission facility for supplying outgoing voice frequency data signals thereto;

a signal receive-out port adapted for connection to said subscriber station during only the four-wire mode of operation for receiving said incoming voice frequency data signals from said receive-in port;

a signal transmit-in port adapted for connection to said subscriber station during both the four-wire and two-wire modes of operation for sending said outgoing voice frequency data signals to said transmit-out port;

said transmit-in port functioning as a bidirectional port and being used also to receive said incoming voice frequency data signals from said receive-in port during the two-wire mode of operation;

2W/4W circuit means connected between said first signal transmission path and said second signal transmission path for preventing said incoming voice frequency data signals arriving at said receive-in port from said transmission facility from being returned to said transmit-out port during the two-wire mode of operation;

gain/loss circuit means coupled to said receive-in port for receiving said incoming voice frequency data signals from the first signal transmission path of said four-wire transmission facility and for amplifying or attenuating said incoming voice frequency data signals and sending them to the receive-out port during the four-wire mode of operation and sending them to the transmit-in port during the two-wire mode of operation; and power supply circuit means for operating said termination circuit from an internal shelf power or a line power supplied externally, said power supply circuit means including a multiposition switch for switching between the shelf power and the line power.

* * * * *